INVENTOR.
WILLIAM P. LEAR
BY Harold J. Downes
ATTORNEY

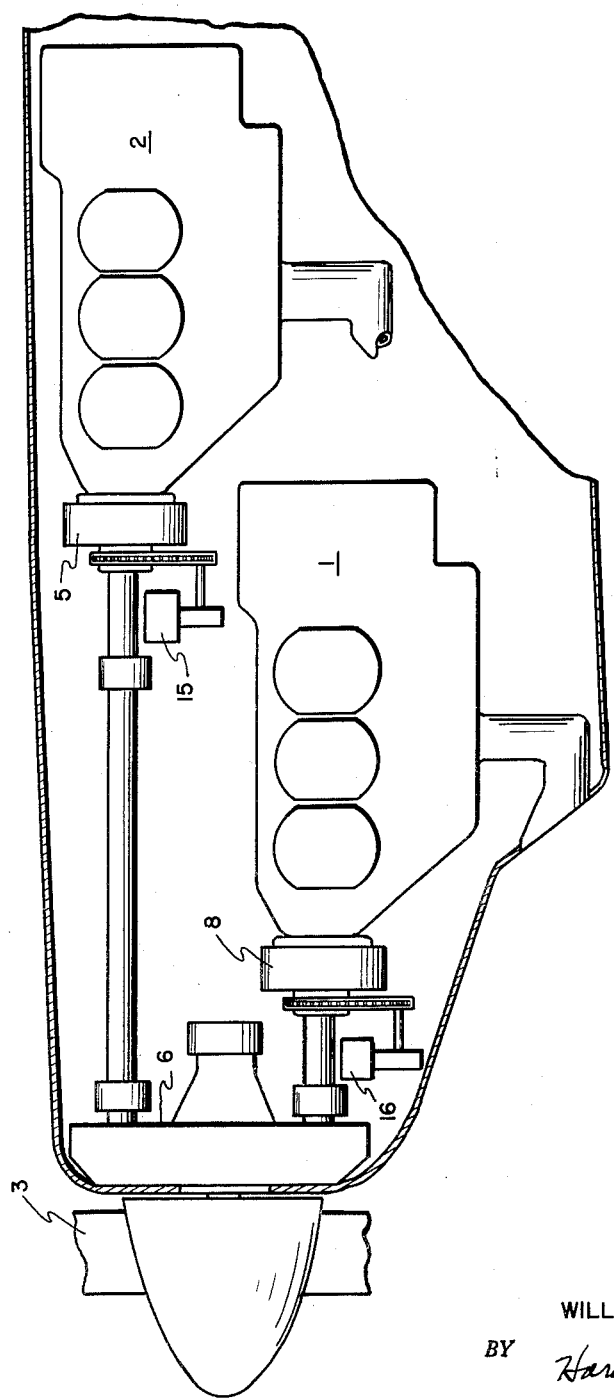

April 25, 1961 W. P. LEAR 2,981,069
TWIN-ENGINE AIRCRAFT PROPELLER DRIVE
Filed May 1, 1958 5 Sheets-Sheet 3
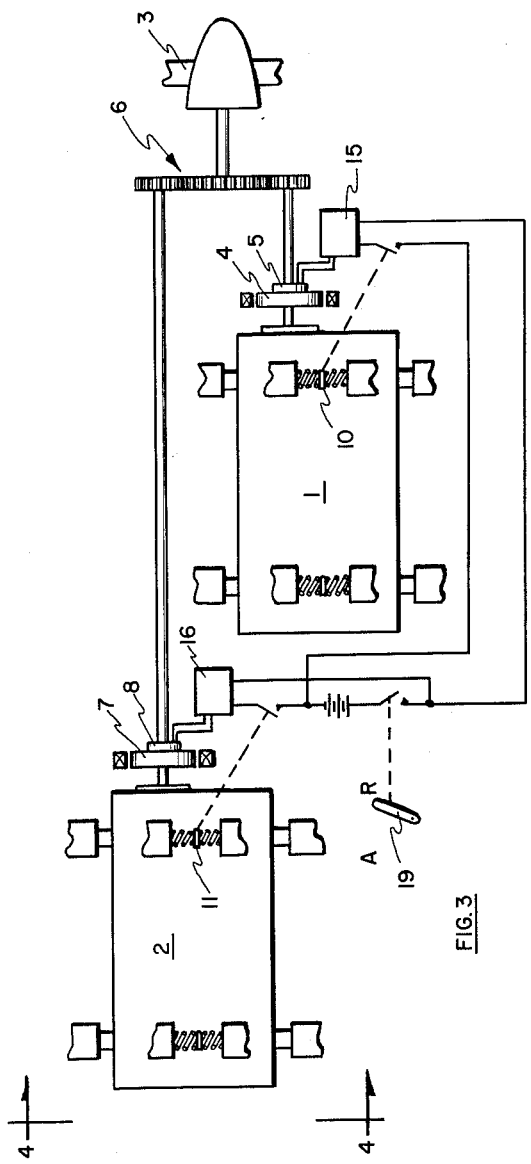
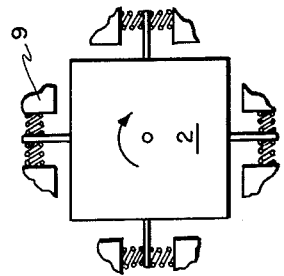
INVENTOR.
WILLIAM P. LEAR
BY Harold J Downes
ATTORNEY April 25, 1961 W. P. LEAR 2,981,069
TWIN-ENGINE AIRCRAFT PROPELLER DRIVE
Filed May 1, 1958 5 Sheets-Sheet 4

INVENTOR.
WILLIAM P. LEAR
BY Harold J. Downes
ATTORNEY

April 25, 1961 W. P. LEAR 2,981,069
TWIN-ENGINE AIRCRAFT PROPELLER DRIVE
Filed May 1, 1958 5 Sheets-Sheet 5

*INVENTOR.*
WILLIAM P. LEAR
BY Harold J. Downes
ATTORNEY

United States Patent Office 2,981,069
Patented Apr. 25, 1961

2,981,069

TWIN-ENGINE AIRCRAFT PROPELLER DRIVE

William P. Lear, Pacific Palisades, Calif., assignor to Lear, Incorporated

Filed May 1, 1958, Ser. No. 732,393

2 Claims. (Cl. 60—97)

This invention relates to the propulsion of aircraft and, in particular, to a system for driving an aircraft propeller by means of two independent aircraft engines, either of which may be de-coupled from the propeller upon malfunctioning.

Propeller driven aircraft are logically divided into two major classes: The single engine class and multi-engine class. A single engine airplane has the pre-eminent advantage of minimum drag-per-horsepower of the engine, and the disadvantage of total dependence upon a single power plant. The multi-engine aircraft, on the other hand, suffers from increased aerodynamic drag due to the necessity for a number of nacelles, or engine enclosures, equal to the number of engines and totaling a frontal area in excess of the total which would be required for a single engine having the same horsepower as the total horsepower of the number of engines in the multi-engine aircraft. On the other hand, as is well known, most multi-engine aircraft are capable of functioning, at least in an emergency, on less than the total number of engines. From a dependability standpoint, therefore, the multi-engine aircraft is much to be preferred.

It has long been recognized that if one could achieve multi-engine dependability, but with a configuration presenting only a single nacelle to aerodynamic flow, the advantages of the dependability of multi-engine aircraft could be achieved together with the advantage of minimum drag, which is characteristic of the single-engine airplane. Attempts have therefore been made in the past to place two aircraft engines in the fuselage of an airplane and couple them to a single airplane propeller with a gear box and overrunning clutches. The theory of operation of this arrangement was that if one of the engines failed to deliver as much torque as the other, its overrunning clutch would be disengaged and the propeller would be driven by the engine whose capabilities had not been impaired. This arrangement, however, has been found to be unsatisfactory for the reason that it is virtually impossible to cause any two aircraft engines to deliver the same torque for any substantial period of time, except under highly idealized test-stand conditions. Variations in intake manifold pressure due to aerodynamic flow around the airplane, including gusts, and mechanical difficulties in throttle settings have prevented the practical realization of a theoretically satisfactory idea. In actual practice, it has been found that the overrunning clutches are almost constantly engaging and disengaging because of hunting in the torque output of the two engines. This "chattering" or alternate engaging and disengaging of the overrunning clutches has led to their early destruction and also the setting up of undesirable torsional oscillations which produced fatigue in the engine and airframe. Also, since the aircraft engines must be fabricated to be of as light a weight as possible, they rarely, if ever, have been made with a flywheel to smooth their torque output. The natural pulsations of their output have therefore been transmitted directly to the gear box and propeller drive involved with the result that fatigue failures were common and undesirable harmonic vibrations were set up. Accordingly, prior to this invention, no practical method of coupling two independent aircraft engines to the same propeller has existed.

This invention contemplates apparatus for successfully coupling two independent aircraft engines together, which takes into account the natural roughness in the torque delivery of the conventional aircraft engine. It further contemplates means for automatically disconnecting either engine from the load when it ceases to deliver torque at the throttle setting commanded and commences to be a drag on the other engine. It further contemplates the provision of a novel means of eliminating torsional harmonic oscillations ordinarily associated with aircraft engines powering a multi-element drive mechanism.

This invention has for its primary object the provision of an aircraft propeller drive system having multi-engine dependability and single-engine simplicity and aerodynamic efficiency.

It is another object of this invention to provide a mechanical clutching system for connecting either or both of two engines to a single driven member, which system is responsive to failure of either engine in operation.

It is another object of this invention to provide a novel means for disconnecting an aircraft engine from its load when the engine malfunctions.

It is another object of this invention to provide a two-engine aircraft propeller drive system which is operative to disconnect one engine when it malfunctions, but which remains connected irrespective of malfunction when less than a predetermined throttle setting is effected.

Other objects of the invention will become apparent from the following description taken in connection with the accompanying drawings, in which:

Fig. 2 is a side view of the nose portion of an airplane including this invention;

Fig. 3 is an over-all schematic of the invention;

Fig. 4 is an end view of the device shown in Fig. 3;

Figure 1:
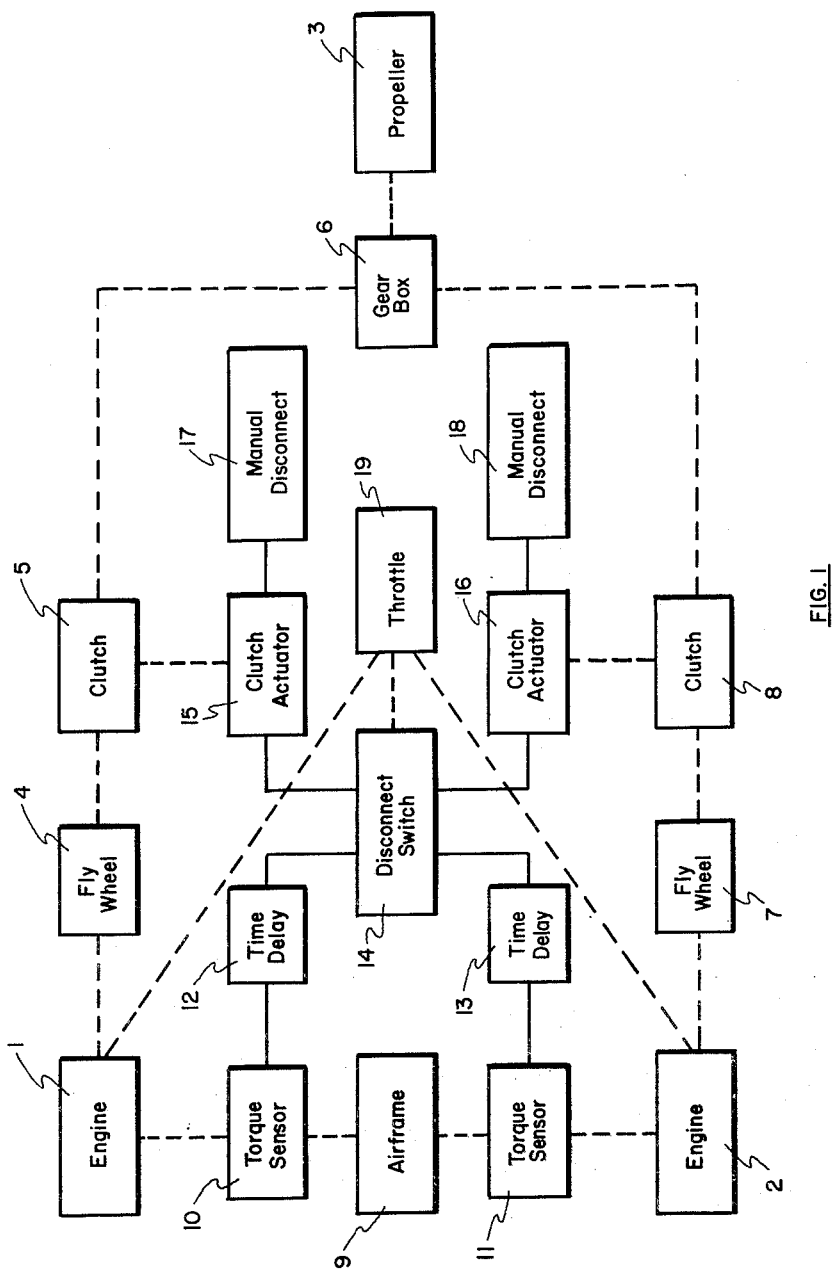
Fig. 1 is a block diagram of the invention.

Referring now to the drawings and, in particular, to Figs. 1 and 2, engines 1 and 2 are operative to drive propeller 3 under normal conditions. Engine 1 is physically coupled to flywheel 4 which, in turn, is connected by clutch 5 to gear box 6 which, in turn, drives propeller 3. Engine 2 is connected to drive flywheel 7 which, in turn, drives clutch 8 which, through gear box 6, also drives propeller 3. Engines 1 and 2 are both mounted on airframe 9 by conventional shockmounting, but interposed between the engine and airframe in any suitable manner, including a manner to be shown hereinafter by way of example, are torque sensors 10 and 11 whose function it is to sense the magnitude and direction of torque reaction between the airframe and each engine. Torque sensors 10 and 11 have an output which is fed to time delay devices 12 and 13, respectively, as shown in Fig. 1, and thereafter to disconnect switch 14. Disconnect switch 14 serves to operate clutch actuators 15 and 16 which, in turn, operate clutches 5 and 8, respectively. Clutch actuators 15 and 16 also may be operated by manual disconnects 17 and 18, respectively, as shown in Fig. 1.

Referring to Fig. 2, it is seen that the physical arrangement of the elements of the invention shown in Fig. 1 is as compact as possible and presents approximately the same frontal area to aerodynamic flow as that of a single engine, with engine 1 being located below and forward of engine 2 and with the gear box and clutches all arranged within the forward end of the aircraft fuselage.

Systemwise, the device functions in the following manner. Under normal operating conditions engines 1 and 2 drive propeller 3 through clutches 5 and 8 which are normally engaged. Flywheels 4 and 7 are provided to smooth out the torque output of the engines. As previously related, it is a normal characteristic of aircraft-type engines which are designed to be of as light weight as possible, that the torque output is very rough. Because the crankshaft, and in fact all parts of the engine, are made to be only as heavy as is absolutely required to withstand the loads for which they are designed, there is a very direct relationship between the power generated in the cylinders and the torque output at the shaft. Thus, there is very little flywheel effect from the rotating parts of an aircraft engine, and in aircraft, flywheels are considered to be an impossible luxury from the weight standpoint. Nevertheless, in accordance with this invention, I have provided flywheels 4 and 7 for the purpose of smoothing the torque output of engines 1 and 2. These flywheels have been provided for two reasons. First of all, the provision of these flywheels offers a method of virtually eliminating torsional vibration problems in the transmission of power from the engines to the propeller through the complex system of springs and masses which the various shafts and gears connecting the engines to the propeller represent. Analytically speaking, each shaft is a torsion spring and each gear, too, has its spring characteristics. The system, looking from the engine to the propeller, therefore can be replaced for analytical purposes by a single spring having a certain predetermined spring constant. The various masses involved, too, may be replaced for analytical purposes by a single mass, and the system has a certain natural torsional frequency. As is well known, if one excites a system having a certain natural frequency, with a forcing vibration or a forcing torsional disturbance approaching the natural frequency, destructive amplitudes of vibration will occur. The provision of flywheels 4 and 7 eliminates this entire problem because these flywheels are made to have sufficient polar moment of inertia to substantially completely smooth the torque output of the engines. With no particular forcing frequency applied to the mechanical linkage between the flywheel and the propeller, torsional vibration is no longer a problem.

Figure 5:
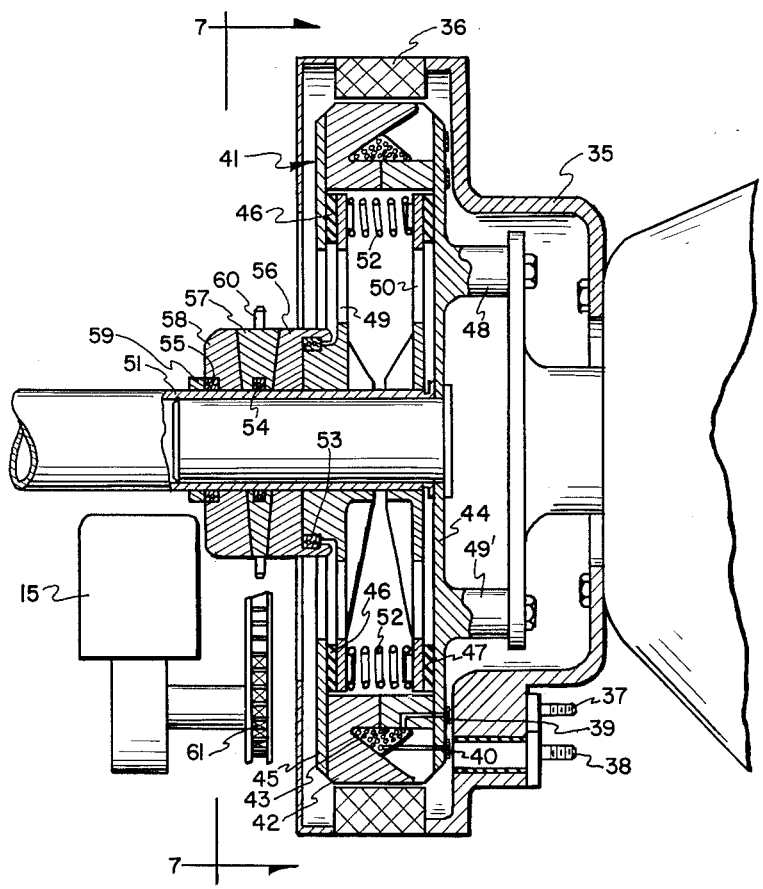
Fig. 5 is a detailed elevational view, partly in section, of the clutch and alternator portion of this invention.

The second reason for using or permitting the use of flywheels in this system is that a novel method has been found for utilizing in a constructive manner the mass of the flywheel, which would otherwise constitute non-essential weight for the aircraft. As is well known, every aircraft has electrical power requirements which are normally satisfied by the inclusion of a generator in the engine assembly at one point or another. This generator normally weighs several pounds and is driven directly by the engine. While aircraft generators normally are relatively small-diameter machines, it has been found in accordance with this invention that by concentrating the mass of an electric generator as far as possible near its radial extremity and by building a generator which is in essence a flywheel, the mass of iron which is necessary for electrical generation purposes can serve the dual purpose of a flywheel. As a further weight-saving device, the elements of the clutch have also been included in one embodiment of this invention in a single combination clutch, generator and flywheel. Details of this device are shown in Fig. 5.

It is apparent, therefore, that flywheels 4 and 7 may be practically combined in an electric generator with clutches 5 and 8 in a device having very little mass in excess of what is normally devoted to the purpose of electric power generation in an aircraft engine.

In normal operation, therefore, clutches 5 and 8 are engaged and flywheels 4 and 7 serve the dual purpose of torque smoothing and power generation. During normal cruising conditions, torque sensors 10 and 11 have no output and clutch actuators 15 and 16 are not operative to disconnect clutches 5 and 8. In the event of failure of, for example, engine 1, torque sensor 10 is operative through time delay 12 to throw disconnect switch 14. Clutch actuator 15 is immediately caused to operate clutch 5 with the result that engine 1 is disconnected from gear box 6. The aircraft then continues to fly, being powered only by engine 2. In a similar manner, failure of engine 2 results in its being disconnected from gear box 6.

In the event that throttle 19 is reduced in setting below a certain predetermined value, provision is made to render switch 14 inoperative so that even though one of the torque sensors senses a reversal in torque reaction between one of the engines and the airframe, that particular engine will not be disconnected from the load. It will be apparent that this feature in necessary for a condition such, for example, as a dive, where the airplane propeller is wind-milling and actually driving one or both of the engines. During this condtion the throttle is normally retarded to one-third or less of the rate of output of the engines and it would not be desirable to cause either of the engines to be disconnected during this condition.

It should be pointed out that torque sensors 10 and 11 are sensitive to the reaction torque existing between the engine and the airframe at all times when the engine is delivering power. As is well known, if an engine is designed for clockwise rotation of its output shaft, a counterclockwise torque is applied by its mounts to the airframe. Now, torque sensors 10 and 11 are normally inoperative when the torque reaction is in the sense corresponding to normal output. However, when the engine itself is being driven by the propeller, the natural resistance of the engine to overspeeding causes a reversal of torque output to the aircraft, and it is this reverse torque to which torque sensors 10 and 11 must be sensitive.

Figure 6:
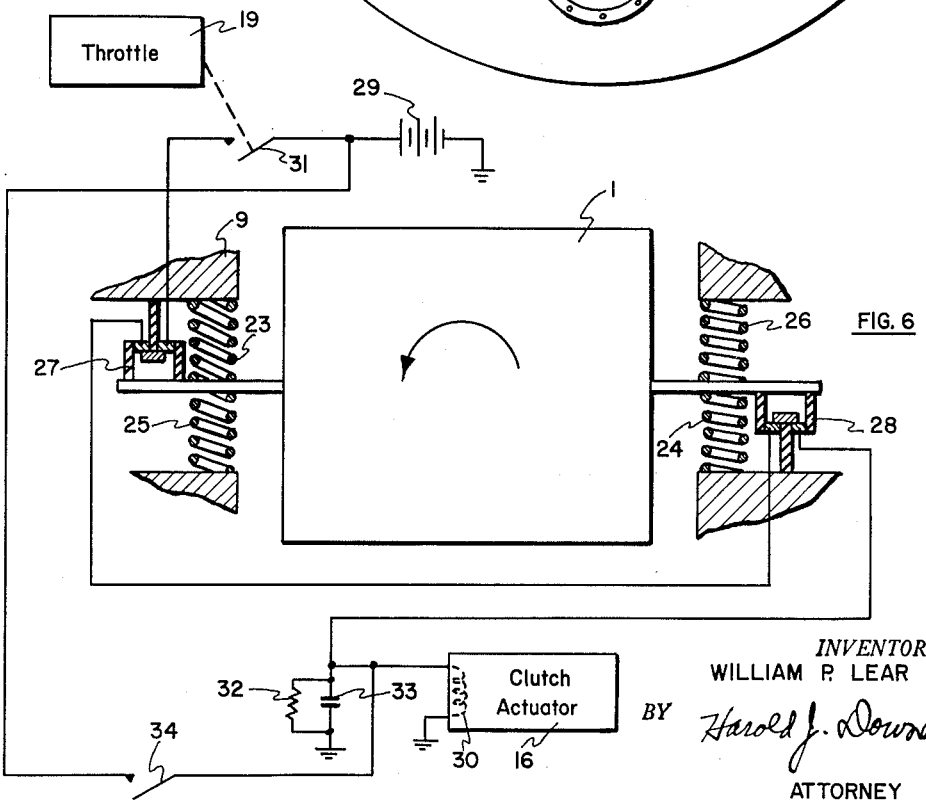
Fig. 6 is a circuit diagram of a portion of the invention.

Referring now to Fig. 6, assuming that the direction of rotation of the propeller is counterclockwise as viewed from Fig. 6, the reaction torque of engine 1 upon airframe 9 is clockwise, thus depressing springs 23 and 24, and extending springs 25 and 26. Compression of springs 23 and 24 causes switches 27 and 28 to remain open so that current from battery 29 does not reach winding 30 of clutch actuator 16 when engine 1 is delivering normal torque.

It must be borne in mind that clutches 5 and 8 are normally engaged, and operation of clutch actuators 15 and 16 serves to disengage the clutches. Switch 31 is therefore so connected to throttle 19 that switch 31 remains open unless the throttle is advanced to at least one-third position, i.e., to a position calling for roughly one-third of the rated power output of the engine. Assuming, therefore, that throttle 19 is advanced to normal cruising position, switch 31 is closed and current flows through switch 31 to switch 27, thence to switch 28 and to winding 30 of clutch actuator 16. Now, as has been previously related, switches 27 and 28 are open during normal operation of the engine. However, should the engine malfunction and cease to deliver driving torque, due to the load which a dead engine places on the system, the engine which remains in functioning condition will drive the malfunctioning engine through the gearing and clutch system shown in Fig. 1. If the malfunctioning engine is now being driven rather than driving, the direction of reaction torque applied to the airframe 9 is reversed with the result that springs 25 and 26 are compressed and springs 23 and 24 are extended. This causes switches 27 and 28 to close, permitting current to flow to clutch actuator winding 30, resulting in actuation of the clutch and disengagement of the malfunctioning engine from the gear box 6.

To prevent energization of clutch actuator 16 due to momentary faltering of the engine or momentary torque reversals for other causes, a time delay circuit comprising resistor 32 and capacitor 33 is provided. The effect of this network is that if switches 27 and 28 are suddenly closed, a predetermined time will elapse while capacitor 33 is being charged before winding 30 is actually energized. If during this period switches 27 and 28 are again opened, winding 30 will not be energized and clutch actuator 16 will not function. Resistor 32, which should be of relatively high resistance, is provided for slowly discharging capacitor 33 so that both its plates are normally at ground potential. The time delay afforded by the network comprised of resistor 32 and capacitor 33 should normally be of the order of three or four seconds in order that disengagement of the clutches does not occur for momentary power fluctuations such as might be caused by one of the engine's cylinders missing or backfiring.

Switch 34, which connects battery 29 directly to winding 30, is provided for test purposes so that for ground check-out the engines may be run up independently as desired.

Referring now to Fig. 5, a detailed sectional view of the combination clutch, flywheel and alternator of this invention is shown. Casing 35 is bolted directly to engine 1 and carries stator 36, made up of laminated iron and a series field winding, at its periphery. Also carried by casing 35 are brushes 37 and 38 which engage slip rings 39 and 40 on rotor 41 of the alternator portion of the invention. It will be noted from Fig. 5 that rotor 41 is of unconventional design in that, among other things, the mass of the rotor is concentrated very largely at the periphery. The rotor is made up of interlocking, opposed, pointed pole pieces 42 which surround winding 43, which is connected at either end to slip rings 39 and 40. Pole pieces 43 are held in place by rotor frame members 44 and 45, which are essentially flat, annular plates at their extremity and which also carry clutch bands 46 and 47 of friction material, as shown. Rotor frame member 44 is secured to the shaft of the engine by means of raised bosses 48 and 49' which receive bolts from the standard flange of the engine shaft. Thus, it is apparent that rotor 41 rotates continuously whenever the engine is rotating. Clutch discs 49 and 50 are keyed to output shaft 51, which in turn is attached to the gear box, as shown in Fig. 2. Clutch discs 49 and 50 are free to slide on shaft 51 and are normally held apart by compression springs 52 which are provided around the periphery of the clutch plates. When these clutch plates are held apart, they engage friction material 46 and cause engagement of the clutch. It will be noted that rotor frame member 45 is open in its central portion and that bearings 53, 54 and 55 permit clutch engagement collars 56, 57 and 58 to rotate freely with respect to the shaft. Shaft 51 has attached to it end thrust collar 59 which, in turn, keeps collars 56, 57 and 58 from translating to the left on the shaft.

It will be noted that clutch engagement collars 56, 57 and 58 are, in reality, truncated, hollow cylinders, i.e., the central collar 57 is wedge-shaped when viewed in elevation, so that when it is rotated out of the position shown in Fig. 5, collars 58 and 56 separate. Since collar 59 prevents translation of collar 58 to the left in Fig. 5, the result of rotating collar 57 is a translation of collar 56 to the left. However, since springs 52 are provided, shaft 51 moves to the left to the same extent as collar 56 moves to the right. In other words, rotation of collar 57 causes plates 49 and 50 to approach each other and become disengaged from friction material 46.

Collar 57 is caused to rotate by gear 60, which is chain-driven from gear 61 on actuator 15, which in turn is caused to operate by current flowing from switch 14 in Fig. 1.

Figure 7:
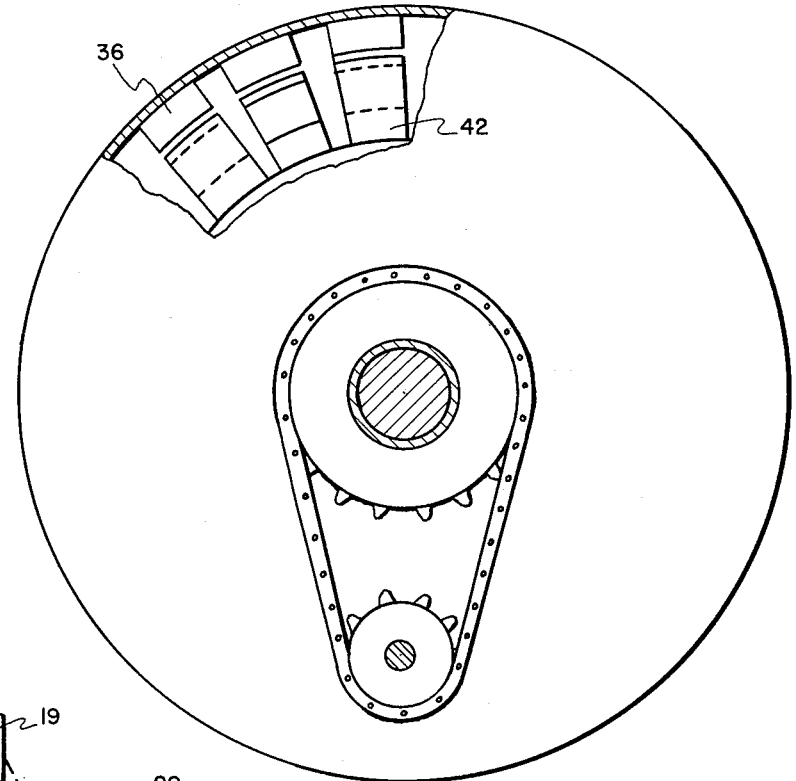
Fig. 7 is an end view of the device shown in Fig. 5.

Thus, it can be seen from Figs. 5 and 7 that when the clutch is engaged the entire rotor for the device shown in Fig. 5 serves as a flywheel. Both parts of the clutch rotate as well as the rotor of the alternator. The entire moment of inertia of the rotor is thus available for flywheel purposes. Since the mass thereof is concentrated at the periphery of the rotor, its effectiveness as a flywheel is relatively large in comparison to its actual mass.

Electrically, the alternator functions by having direct current from the aircraft electrical system applied to stator 36 in a conventional manner to create a magnetic field. Output alternating current is derived from winding 42 through slip rings 39 and 40 and brushes 37 and 38. This alternating current may be rectified in a conventional manner and fed back to the electrical system of the aircraft to replenish its batteries. The function of springs 52 is to assure that clutch discs 49 and 50 apply an even pressure to friction material 46 throughout the circumference of the clutch. Also, by the use of multiple springs at the periphery of the clutch, it can be seen that the flywheel effect of the total assembly is considerably enhanced.

While in the preferred embodiment of the invention a combination flywheel, alternator and clutch has been disclosed, it should be noted that the paramount advantage of the invention, i.e., the ability to disconnect a disabled power plant and still continue flying, can be achieved as shown in the block diagram of Fig. 1 without consolidating the design of the flywheel, clutch and alternator. The modification shown in Figs. 5 and 7 does, however, effect a substantial saving in weight, and makes the use of this disconnect system feasible under certain conditions where it would otherwise not be feasible from the weight standpoint.

Although the present invention has been described with a certain degree of particularity, it is understood that various modifications in the details and arrangements of parts may be had without departing from the spirit and scope of the invention as hereinafter claimed:

I claim:

1. Means for propelling an aircraft with improved dependability, comprising a propeller, two engines mounted in said aircraft, clutch means drivingly connecting each of said engines independently to said propeller, an individual actuator for actuating each said clutch means, throttle means for controlling the power produced by said engines, means for sensing the magnitude and direction of torque reaction between each said engine and said aircraft, means for controlling said actuator means for the said clutch for each said engine in delayed response to its respective said torque reaction sensing means, and means responsive to said throttle control means for rendering said actuator controlling means inoperative for throttle setting corresponding to less than a predetermined percentage of rated output of said engines.

2. Means for propelling an aircraft with improved dependability, comprising a propeller, two engines mounted in said aircraft, clutch means drivingly connecting each of said engines independently to said propeller, an individual actuator for actuating each said clutch means, throttle means for controlling the power produced by said engines, means for sensing the magnitude and direction of torque reaction between each said engine and said aircraft, means for controlling said actuator means for the said clutch for each said engine in response to its respective said torque reaction sensing means, time delay means interposed between each said torque reaction sensing means and its respective said actuator means for causing each said actuator means to operate only after a predetermined time delay after the response of said torque reaction sensing means, and means operable in response to the throttle settings of said prime movers for rendering said clutch actuator means inoperative at less than a predetermined throttle setting.

(References on following page)

References Cited in the file of this patent

UNITED STATES PATENTS

| | | |
|---|---|---|
| 1,171,948 | Hassler | Feb. 15, 1916 |
| 1,946,513 | Webster et al. | Feb. 13, 1934 |
| 2,103,274 | Sanford | Dec. 28, 1937 |
| 2,225,315 | McCollum | Dec. 17, 1940 |
| 2,252,518 | Martin | Aug. 12, 1941 |
| 2,255,773 | Heftler | Sept. 16, 1941 |
| 2,376,545 | Livermore | May 22, 1945 |
| 2,462,825 | Zimmerman et al. | Feb. 22, 1949 |
| 2,766,864 | Schilling et al. | Oct. 16, 1956 |

FOREIGN PATENTS

| | | |
|---|---|---|
| 710,662 | Great Britain | June 16, 1954 |